Oct. 17, 1961 W. H. KREIDL 3,004,293
METHOD OF TREATING A FOAMY MATERIAL HAVING A HIGH WATER
CONTENT AND PRODUCT OBTAINED THEREBY
Filed Sept. 15, 1959 2 Sheets-Sheet 1

INVENTOR:
WERNER H. KREIDL,
BY Ernest D. Marmorek
HIS ATTORNEY.

```
WET UREA FORMALAHYDE RESIN
     GEL FOAM BLOCK
BULK DENSITY (DRY) 0.1-1.0 LBS.
PER CUBIC FOOT AND AT
LEAST ABOUT 70% MOISTURE
```

STEP 1 → COMMINUTING PREFERABLY BY GRINDING

```
  CELLULAR PARTICLES
(0.1—1.0 INCHES LONG) OF
       GEL FOAM
```

STEP 2 → DRYING

```
     FLUFFY POWDER
FELTABLE WITH WATER
BULK DENSITY LESS THAN
2 LBS. PER CUBIC FOOT
```

STEP 3 → FORMING UNDER HUMIDITY 5-25% OF WATER BY COMPRESSING AT TEMPERATURES OF 212° TO 375°F.

```
CONSOLIDATED POROUS MASS OF
BONDED CELLULAR PARTICLES
HAVING BULK WEIGHT OF
0.2 LBS. PER CU.FT. TO 2LBS. PER CU.FT.
```

Fig. 9.

United States Patent Office 3,004,293
Patented Oct. 17, 1961

3,004,293
METHOD OF TREATING A FOAMY MATERIAL HAVING A HIGH WATER CONTENT AND PRODUCT OBTAINED THEREBY
Werner H. Kreidl, 956 5th Ave., New York 21, N.Y.
Filed Sept. 15, 1959, Ser. No. 840,051
12 Claims. (Cl. 18—47.5)

The invention relates to a method of treating materials having the consistency of foam and a high water content, such as for instance urea formaldehyde, and the product obtained thereby.

Lightweight foam with a high water content resists drying, requiring a large drying time.

It is accordingly among the principal objects of the invention to produce a lightweight foam in much shorter time than has heretofore been possible.

It is a further object of the invention to reduce the drying time for such a product to a fraction of the present requirement.

It is another object of the invention to comminute a foam mass into small particles and to dry the particles at greatly reduced time, and then to recombine the particles into a foam mass such as a board or the like.

It is another object of the invention to provide a method of treating such a material to dry it rapidly and to form a porous coherent article.

It is yet another object of the invention to provide a method of treating such a material to dry rapidly and simultaneously to combine the material with another material to impart a desirable property to the resulting porous coherent article.

It is still another object of the invention to provide a method of treating such a material to dry rapidly, and simultaneously to combine the material with a fibrous material of great tensile strength to impart increased tensile strength to the resulting porous coherent article.

It is a further object of the invention to provide a finished product of a large number of small dry foamy particles adhering to form a coherent porous article.

It is still a further object of the invention to provide a finished product of a large number of small dry foamy particles in combination with another material, to form a coherent porous article having a desired property.

It is yet another object of the invention to manufacture a porous article without cracks and crevices which easily form during drying of a relatively large urea resin foam gel of high water content.

With the above and other objects of the invention in view, the invention consists in the novel methods, construction, arrangement and combination of various devices, elements and parts, as set forth in the claims hereof, certain embodiments of the same being illustrated in the accompanying drawings and described in the specification.

The foregoing and other objects of the invention will be best understood from the following description of exemplifications thereof, reference being had to the accompanying drawings, wherein.

Figure 1:
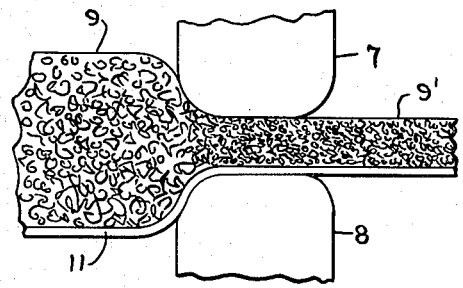
FIG. 1 is a side elevational view illustrating a method in accordance with the invention, and the finished article obtained thereby.

FIG. 9 is a flow diagram illustrating the novel procedural steps of the invention in which the starting material is a wet cellular urea formaldehyde foamed gel having a density of between 0.1 and 1.0 pound per cubic foot and a moisture content of at least about 70% of water by weight. In the first operational step the wet gel is comminuted, preferably by grinding, into particles having a linear dimension of less than 1 inch, without substantially changing the cell structure of the foamed resin, these comminuted particles having a bulk weight of less than 2 pounds per cubic foot. In the second step the comminuted particles are dried to a dry fluffy powder which is adapted to be compressed at room temperature in the presence of moisture, e.g. 5–20% relative humidity. In the third step the dry powder is compressed in the presence of moisture, 5–20% relative humidity, to provide a condition aiding the felting of said particles with each other so that under compression and heating the cellular structure of the separate particles in the compressed mass is maintained, the pressure being sufficient to provide a coherent porous final shaped mass of bulk weight between 0.2 pound per cubic foot and 2 pounds per cubic foot. In this third step heating is at a temperature between about 212–375° F. for a period of time under compression to provide above the specified bulk density.

Prior to this invention the wet foamy material has been given its finished shape and subsequently dried. Due to the foamy consistency of the substance and the moisture in the article in its finished shape, the drying process proved time consuming.

According to the present invention, the wet foamy material, for instance urea formaldehyde having a density of between 0.1 pound per cubic foot (lb. per cu. ft.) and 1 lb. per cut ft. and a moisture content equalling or exceeding 70% water by weight or volume, may be first comminuted into small particles, having a linear dimension of less than one inch, for instance by grinding.

The wet foamy material, of a water content exceeding or equally about 70% by weight or volume may be comminuted into fine or small particles immediately after setting to a stable gel which can be handled and ground without substantially changing its cell structure. It may, however, be of advantage to let the foamy material set for at least two hours before comminuting it, or even partly or completely to dry it before grinding or comminuting it.

A powder or granular material is thus obtained which contains substantially star-shaped particles having a bulk weight of less than 2 lbs. per cu. ft. These particles are then dried; it will be obvious that the drying of these small particles, having large surfaces as compared to their volume, is rapid compared to the drying of the shaped article. A dry fluffy powder or granular material is the result of the drying process.

The dry fluffy powder or granular material is thereafter compressed at elevated temperatures of between approximately 212° F. to 375° F. to form a coherent porous article of desired shape and a bulk weight of between 0.2 lb. per cu. ft. and 2 lbs. per cu. ft. If the dry foamy particles were to be compressed at room temperature, they would be liable to fall apart and the composite article may break.

Even if the foamy material was partly or completely dried before comminuting it, the process offers the advantage that drying can be effected much faster and by simpler methods, as it is not necessary to avoid cracks and stresses due to uneven drying.

It has been found that if the particles are compressed in the presence of a small amount of humidity, for instance a relative humidity of from 5 to 20 percent, breakage does not occur and the finished article is pliable, and felts well.

Spraying the dry foamy particles with water has been found a satisfactory method to secure the favorable humidity contents. Instead of spraying with water, steam may be blown into the mass thus moistening and heating the mass at the same time just prior or during compressing to shape.

It may further be desirable to add a binder to the small dry foamy particles before their reintegration by heating and compressing into a board or similar article.

In one instance it has been possible to reduce the drying time from 24 hours to one minute by the inventive method.

It is a further feature of the invention to combine a desired additive material with the dry foamy particles prior to the heating and compressing, namely either after or before drying, which material will be compressed and heated with the particles and form an integral part of the finished article. The additive material may be incorporated as a filler, adhere to the outside surface of the finished article, be regularly arranged throughout the finished article or combined therewith in any other desired arrangement.

The additive material is selected to impart a desired property to the finished article, such as for instance resiliency or an increase of the tensile strength as compared to the finished article containing the particles alone. Furthermore, other properties of the finished article can be affected in a desired manner by a suitably selected additive material.

In many instances it may be difficult to press the ground and dried foam particles together to obtain a coherent mat of sufficient tear strength. This effort will be made much easier if, before pressing, one mixes in material which easily mats by itself, preferably fibrous material such as cellulosic, cotton and synthetic fibers which have been sized and treated to mat in the usual way as is common practice in the textile and felt industry. It is further of advantage to spray or otherwise impart adhesive to further the matting, of the resin foam particles alone or in combination with other fibrous material. As such an adhesive there can be used: polyvinyl acetate and other water suspension or emulsion adhesives based on styrene, synthetic rubber latexes and the like.

The matting of the resin foam as such can further be enhanced by the addition of swelling agents and depolymerization agents to make the foam surface self-adhesive again, such as acids as for example phosphoric acid, oxalic acid and the like. In all these instances it will be sufficient to spray the adhesive or the acid solution or both on the resin foam powder, before compressing or matting, before or after heating it.

For reinforcing purposes, namely to increase the tensile strength, from 10 to 30 percent by volume of a strong fibrous material is mixed with the particles to be embedded in the finished article. Suitable materials are glass wool, synthetic fibers such as "nylon," cotton fibers, cellulose, or wood fibers.

The following are some examples of the method according to the present invention and of the products obtained thereby.

(1) A wet urea resin foam, having a bulk weight of about 0.1 lb. per cu. ft. is ground to a granular material of an average particle size of about 0.1 inch. The granular material is dried and brought to a moisture content of about 10 percent in a humidity chamber. The foamy particles 9 (FIG. 1) are then compressed for about three minutes between two platens 7 and 8, which have been heated to about 355° F., to a bulk weight of about 1 lb. per cu. ft. A semi-rigid board 9' is obtained which has good thermal and acoustical insulation properties.

(2) A wet urea resin foam, having a bulk weight of about 0.4 lb. per cu. ft., is ground to a powder of an average particle size of 0.05 inch. The resulting powder is dried and brought to a moisture content of 15 percent by spraying with steam.

Figure 2:
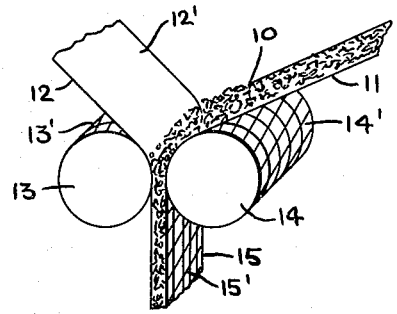
FIG. 2 is a perspective view of another method according to the invention, and the finished article obtained thereby.

As shown in FIG. 2, the moist powder 10 is placed between two sheets of paper 11 and 12 coated at their sides facing the powder with polyethylene 12'. Two rolls 13 and 14, carrying waffle designs 13' and 14' and heated to about 340° F., compress the particles to assume a bulk weight of about 0.7 lb. per cu. ft. The finished product 15 has two outside sheets showing a waffle design 15' and forms a coherent body. The porous finished article has excellent insulating properties and is suitable for use in the packaging industry of friable goods and of deep-frozen food.

Figure 3:
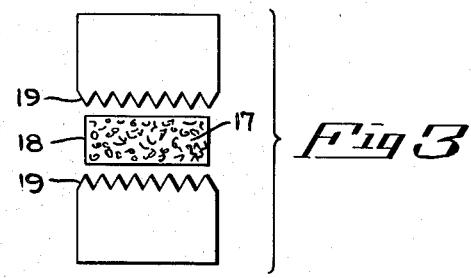
FIG. 3 is a front elevational view illustrating a first stage of still another method of the invention.
Figure 4:
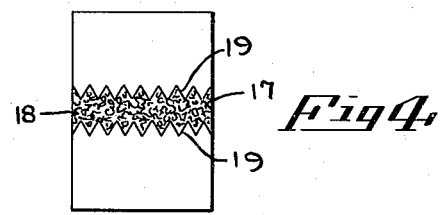
FIG. 4 is an elevational view similar to FIG. 3, but showing the parts in a final stage.
Figure 5:
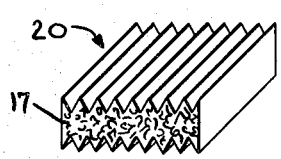
FIG. 5 is a perspective view of the finished article obtained by the method of FIGS. 3 and 4.

(3) A wet urea resin foam, having a bulk weight of between 0.1 to 0.3 lb. per cu. ft., is ground to a granular material of an average particle size of from 0.25 to 0.5 inch. The granular material is dried and brought to a moisture content of about 5 percent by a water spray. The outside surfaces of the granular material 17 (FIGS. 3, 4 and 5) are covered with a mat 18 of cellulose fibers. The combined granular material 17 and mat 18 are compressed between surfaces 19 that had been heated to about 375° F., to assume the shape of a finished article 20, for instance that of a coaster or absorbent pad, to a bulk weight of between 0.2 lb. per cu. ft. and 0.5 lb. per cu. ft.

(4) A wet urea resin foam containing about 75 percent water, is ground to a granular material of an average particle size of about 0.25 inch. The particles are dried in an air current to a moisture content of from 10 to 20 percent and compressed and heated to form a coherent body of a desired shape and bulk weight.

(5) A finished article may be produced which contains from 10 to 30 percent by volume of a strong fibrous material which is irregularly embedded in the coherent porous body formed by the large number of foamy particles. The fibrous material is loosely packed; each fiber may be approximately 2 inches long. Products of increased tensile strength and good resiliency are thus obtained. To incorporate the fibers into the finished products, they are mixed with the particles prior to the compressing and heating stage, namely either before or after drying.

Figure 6:
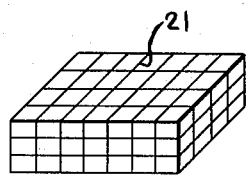
FIGS. 6, 7 and 8 are perspective views of three different finished articles according to the invention.
Figure 7:
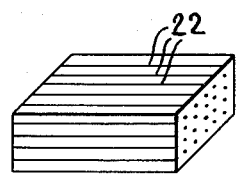

(6) A finished article may be obtained as shown in FIGS. 6 and 7, which contains coarse webs 21 or regularly arranged threads 22, respectively. The webs 21 or threads 22 are embedded in a large quantity of particles either prior to or after drying, and are compressed and heated with the particles to form a coherent porous body. Increased tensile strength is obtained while the insulating and cushioning properties are not affected; the bulk weight is not changed by any appreciable amount.

Figure 8:
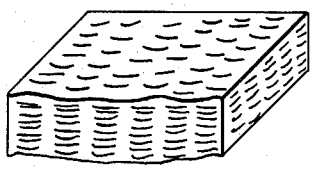

(7) In another embodiment of the invention, coils of horsehair 23 (FIG. 8) or of a synthetic resilient fiber are contained within the body 24 formed by the coherent foamy particles. The resiliency of the finished product is thereby greatly increased.

(5a, 6a, 7a) In either of the examples described under (5), (6), or (7), the cohesion between the filler and the particles may be improved by coating, for instance by spraying, the filler with an adhesive solution or an emulsion. Synthetic rubber latex or a tar emulsion are suitable for this purpose.

(8) The large quantity of foamy small particles is filled into a very coarse mat of rubberized hair or vinyl threads and then compressed and heated to form the finished coherent continuous article of increased strength and resiliency.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. The method of forming a pliable coherent compressed mass of cellular urea formaldehyde foam particles from the wet material in the form of a gel of density in dry form between 0.1 pound per cubic foot and 1 pound per cubic foot and containing at least 70 percent of moisture, comprising the steps of comminuting said wet material to form small particles less than 1 inch linear dimension and dry bulk weight less than 2 pounds per cubic foot, drying said particles to provide a dry fluffy granular material adapted to form a felted pliable porous mass under compression in the presence of moisture without substantially impairing the cellular structure of said particles in the cohered mass, and heating while compressing the particles to form a coherent porous article of bulk weight between 0.2 pound per cubic foot and 2 pounds per cubic foot.

2. The method claimed in claim 1, in which the wet foamy material is comminuted by grinding.

3. The method as claimed in claim 1, comprising the further step of adding an adhesive binder to said comminuted particles prior to the heating and compressing step.

4. The method as claimed in claim 1, further comprising the step, prior to the heating and compressing steps after incorporating a reinforcing material with said comminuted particles to impart mechanical strength to the coherent porous finished article.

5. The method as claimed in claim 4, in which said reinforcing material is a fibrous filler of high tensile strength, the fibrous filler being from 10 to 30 percent by volume.

6. The method as claimed in claim 4, in which the additional material is a covering sheet contacting at least one outside surface of the mass of particles.

7. The method as claimed in claim 4, in which said fibrous filler comprises long strong threads regularly distributed throughout the coherent shaped mass of particles.

8. The method as claimed in claim 4, in which said fibrous filler comprises resilient coils which are regularly distributed throughout the coherent shaped mass of particles.

9. The method as claimed in claim 4, further comprising the step of at least partially coating the reinforcing material which is combined with the coherent shaped mass of small foamy particles with an adhesive binder.

10. The method as claimed in claim 4, in which the reinforcing material is combined with the said comminuted particles by preshaping said material in admixture with said particles and thereafter compressing and heating the mixture into final form.

11. The method claimed in claim 1, in which the particles are dried to contain less than one percent moisture, comprising the further step of adding moisture after the drying step to impart a moisture content of between 5 and 20 percent to the dried particles.

12. A porous coherent pliable compressed mass of cellular urea formaldehyde gel particles having a particle size of between 0.01 to 0.1 inch linear dimension in which the cell structure of the particles is not impaired by compression made by the process of claim 1.

References Cited in the file of this patent

UNITED STATES PATENTS

| | | |
|---|---|---|
| 2,211,429 | Mueller-Cunradi et al. | Aug. 13, 1940 |
| 2,222,028 | Goldschmidt et al. | Nov. 19, 1940 |
| 2,373,401 | King | Apr. 10, 1945 |
| 2,755,509 | Smidth | July 24, 1956 |
| 2,819,993 | Gregory | Jan. 14, 1958 |
| 2,819,994 | Gregory | Jan. 14, 1958 |
| 2,893,063 | Hoppe | July 7, 1959 |

FOREIGN PATENTS

| | | |
|---|---|---|
| 150,869 | Australia | May 18, 1950 |